(12) United States Patent
Elliott et al.

(10) Patent No.: US 7,975,422 B2
(45) Date of Patent: Jul. 12, 2011

(54) WATERFOWL DECOY MOTION SYSTEM

(75) Inventors: James P. Elliott, Buchanan, TN (US);
Phillip L. Casterline, Paris, TN (US);
Andrew S. Elliott, Paris, TN (US); John R. Elliott, Springville, TN (US);
William B. Elliott, Springville, TN (US)

(73) Assignee: Elliott Tool Company, Springville, TN (US)

( * ) Notice: Subject to any disclaimer, the term of this patent is extended or adjusted under 35 U.S.C. 154(b) by 780 days.

(21) Appl. No.: 12/075,778

(22) Filed: Mar. 13, 2008

(65) Prior Publication Data

US 2009/0084018 A1 Apr. 2, 2009

Related U.S. Application Data

(60) Provisional application No. 60/997,086, filed on Oct. 1, 2007.

(51) Int. Cl.
*A01M 31/06* (2006.01)
(52) U.S. Cl. .............................................. 43/3
(58) Field of Classification Search .................... 43/2, 3
See application file for complete search history.

(56) References Cited

U.S. PATENT DOCUMENTS

| | | | | |
|---|---|---|---|---|
| 6,138,396 A * | 10/2000 | Capps | ................................ | 43/3 |
| 6,430,863 B1 * | 8/2002 | Krag | ................................... | 43/3 |
| 6,708,440 B2 * | 3/2004 | Summers et al. | .................. | 43/2 |

* cited by examiner

*Primary Examiner* — Joshua J Michener
(74) *Attorney, Agent, or Firm* — Howard J. Greenwald

(57) ABSTRACT

A waterfowl decoy motion system comprised of a multiplicity of movable decoys, a first elastic drive belt, means for connecting said first elastic drive belt to said movable decoys, a a primary drive pulley, a secondary drive pulley, an electric motor connected to said secondary drive pulley, and a multiplicity of idler puller assemblies.

18 Claims, 13 Drawing Sheets

WATERFOWL DECOY MOTION SYSTEM

CROSS-REFERENCE TO RELATED PATENT APPLICATION

This application claims priority based upon patent application 60/997,086, filed on Oct. 1, 2007.

FIELD OF THE INVENTION

A waterfowl decoy motion system capable of moving a number of floating waterfowl decoys in various directions in a continuous manner.

BACKGROUND OF THE INVENTION

Waterfowl decoy systems are well known to those skilled in the art. By way of illustration, reference may be had to U.S. Pat. Nos. 6,311,425 (flying waterfowl decoy system), 6,321,480 (self propelled waterfowl decoy), 6,339,893 (waterfowl decoy with separately movable wings and feet), 6,408,559 (animated waterfowl decoy apparatus), 6,412,209 (waterfowl decoy for selectively simulating feeding in water), 6,463,690 (steam jet propelled waterfowl decoy), 6,487,811 (waterfowl decoy with self-retracting anchor line), 6,643,971 (waterfowl feeding decoy), 7,117, (self-righting waterfowl decoy with integrated anchor and locking mechanism), and the like. The entire disclosure of each of these United States patents is hereby incorporated by reference into this specification.

By way of further illustration, U.S. Pat. No. 6,138,396 discloses an apparatus for traveling a floating waterfowl decoy continuously around a predetermined route adjacent a surface of a body of water, According to claim 1 of this patent, this system comprises (a) a continuous loop of flexible line constructed of a material suitable for prolonged submersion in a body of water, (b) a plurality of line guides for movably supporting the continuous loop at a plurality of desired positions which define the predetermined route, (c) a plurality of anchors, each of which is securely attached to a corresponding one of the plurality of line guides, for anchoring the line guides below the surface of the body of water at the desired positions along the route, (d) drive means for applying a force to the loop to cause the loop to move around the predetermined route, the drive means operable to maintain continuous operation to continuously cycle the loop around the route, and (e) a decoy tether attached to the loop for tethering a decoy to the loop. The entire disclosure of such United States patent is hereby incorporated by reference into this specification.

None of the prior art waterfowl decoy motion systems are entirely satisfactory. It is an object of this invention to provide an improved waterfowl decoy motion system.

SUMMARY OF THE INVENTION

In accordance with one embodiment of the invention, there is provided a waterfowl decoy motion system comprised of a multiplicity of movable decoys, an elastic drive belt, means for connecting said elastic drive belt to said movable decoys, a primary drive pulley, a secondary drive pulley, an electric gear motor connected to said secondary drive pulley, and a multiplicity of idler puller assemblies.

BRIEF DESCRIPTION OF THE DRAWINGS

Certain embodiments of the invention will be described by reference to the enclosed drawings in which like numerals refer to like elements, and wherein.

DESCRIPTION OF THE PREFERRED EMBODIMENTS

Figure 1:
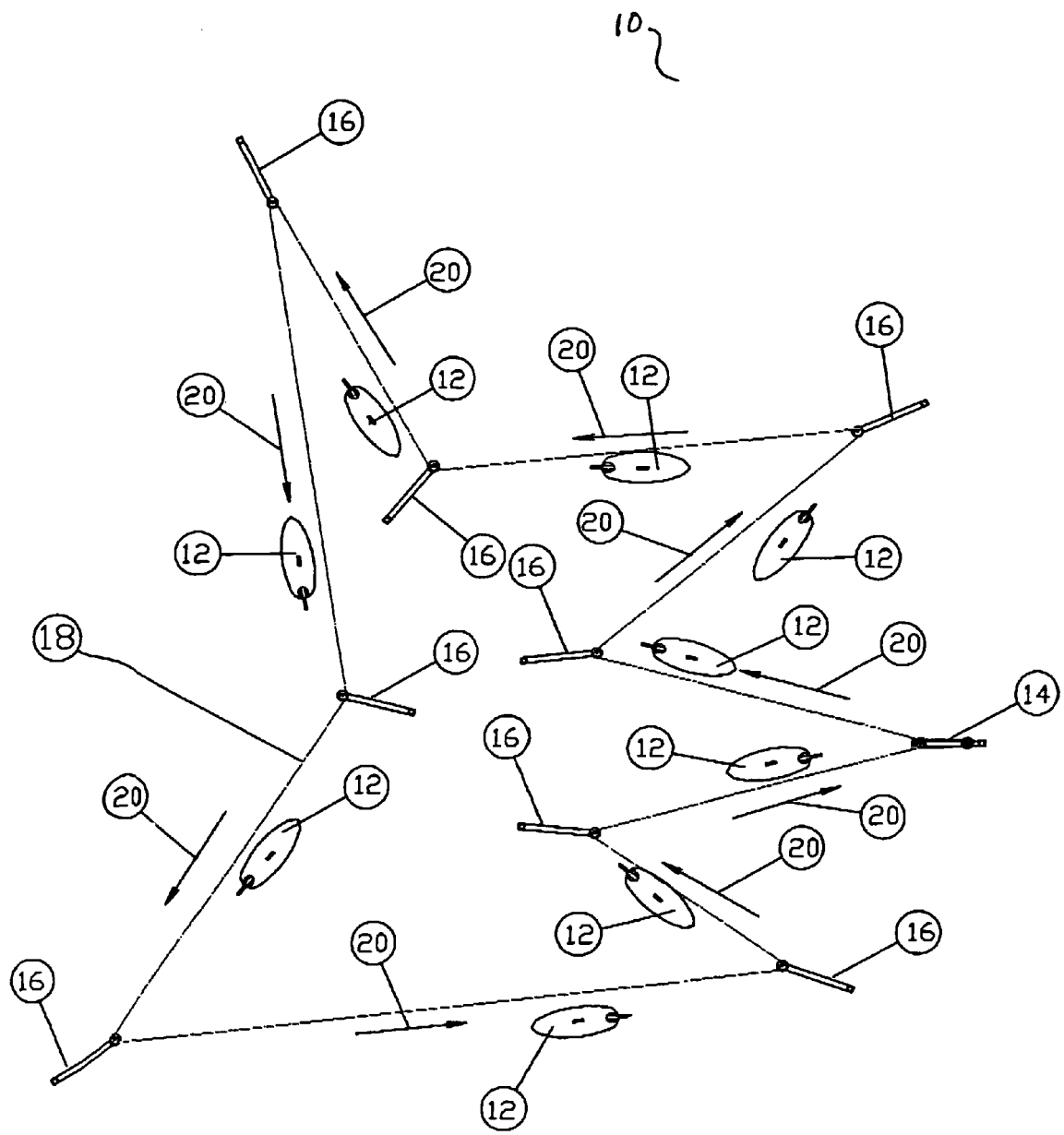
FIG. 1 is a top view of a single drive waterfowl decoy motion system.

In accordance with one embodiment of the invention, there is provided an improved waterfowl decoy motion system that is portable and can be installed at a hunting site in approximately thirty minutes and removed in about half that time, thus rendering it useful to sportsmen hunting public areas and those who may wish to move to a different location in the course of a day's outing. This preferred device, in one embodiment thereof, is comprised of an electric gear motor, a drive pulley, a secondary drive pulley, idler pulley assemblies, a v-belt, an elastic drive belt capable of being stretched more than twice its relaxed length, and short lengths of line or cord to attach the floating decoys to the elastic drive belt, and a power source (which can be a 12 volt D.C. battery, two 12 volt D.C. batteries connected to produce 24 volt D.C. current, or 115 volt AC converted to 12 volt DC by means of a transformer and rectifier). The decoys are preferably attached to the elastic drive belt by passing a line or cord through perforations in the elastic drive belt, or by means of a hole in a tab fastened to the drive belt by an adhesive. The electric gear motor preferably transfers energy to the secondary drive pulley by means of a v-belt and v-belt pulley on the drive shaft. Sprockets and roller chain can also be used. When energized, the gear motor causes the secondary drive pulley to rotate in a horizontal plane with enough torque to drive one or more drive belts.

In this embodiment, the drive belt, when sufficiently stretched, will create enough friction on the drive pulley groove in which it is placed to cause it to travel in a continuous manner when in operation. The direction of travel can be reversed by changing the polarity at the power source or by means of an electrical switch. The speed of travel is determined by the pitch diameter of the primary drive pulley and the pitch diameter of the corresponding groove in the secondary drive pulley on which the v-belt runs and by the diameter of the groove in the secondary in which the drive belt is positioned. A large pitch diameter pulley on the drive shaft and a smaller corresponding pitch diameter groove on the secondary drive pulley results in a faster speed and vice versa. Moving the drive belt to a smaller or larger diameter groove will provide for additional travel speed options.

In operation of this preferred embodiment, the system creates the illusion of a number of waterfowl swimming in a natural random manner.

In this embodiment, the elastic properties of the drive belt further enhance the realistic appearance of the decoys by enabling some to travel at different speeds. This is caused by the potential energy in the drive belt when a decoy encounters an obstruction that impedes its travel. The belt continues to stretch until sufficient energy is built up to overcome the obstacle, at which time that decoy and those close to it will move at a faster rate than those on a more distant part of the belt until the drive belt again returns to its original state of tension. This unusual motion produces disturbances in the water in a localized area as other decoys continue to move about in the normal manner and is typical of the motion created by live waterfowl.

In this embodiment, the elastic properties of the drive belt may also allow the system to remain in operation after the drive belt has come off of one of the idler pulleys which can be caused by floating debris common in places where hunting takes place. This allows the sportsman to continue hunting unimpeded until he desires to correct the malfunction.

With this embodiment, the elastic properties of the drive belt render it practical to use dogs for the retrieval of downed game without fear of entanglement or of causing the system to malfunction. Hunters wading also present no problem.

FIG. 1 is a top view of a single drive belt system 10 as seen from above with waterfowl decoys 12 moving in various directions in a continuous manner. The system depicted in such FIG. 1 includes a single drive assembly 14, a number of idler pulley assemblies 16, an elastic drive belt 18, and such waterfowl decoys 12 connected to such elastic drive belt by conventional means (not shown). In the embodiment depicted, the elastic drive belt 18 preferably is continuous. The direction of travel, in such embodiment, is illustrated by arrows 20 that, in the embodiment depicted, often depict different directions of travel for different sections of the continuous drive belt 18. As will be apparent, the direction of travel may be reversed.

Figure 2:
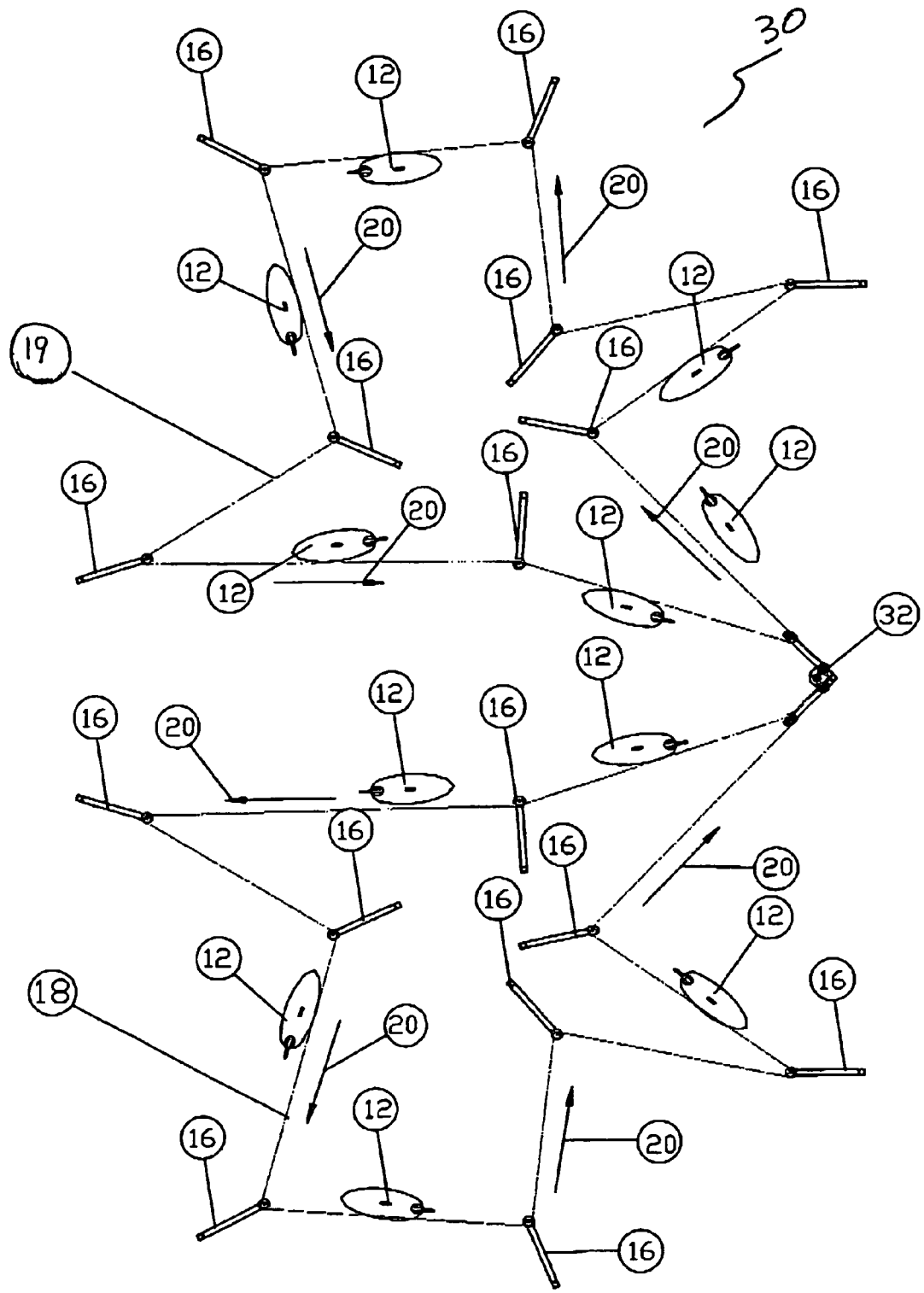
FIG. 2 is a top view of a double drive belt system.

FIG. 2 is a view of a double drive system 30 as seen from above with decoys moving in various directions in a continuous manner. The system includes a double drive assembly 32, a number idler pulley assemblies 16, two elastic drive belts 18,19, and waterfowl decoys 12.

In the preferred embodiment depicted in FIG. 2, a double drive assembly 32 is employed to move two elastic drive belts (18 and 19) in the different directions indicated by arrows 20. The direction(s) of travel may be reversed as desired by the user.

Figure 5:
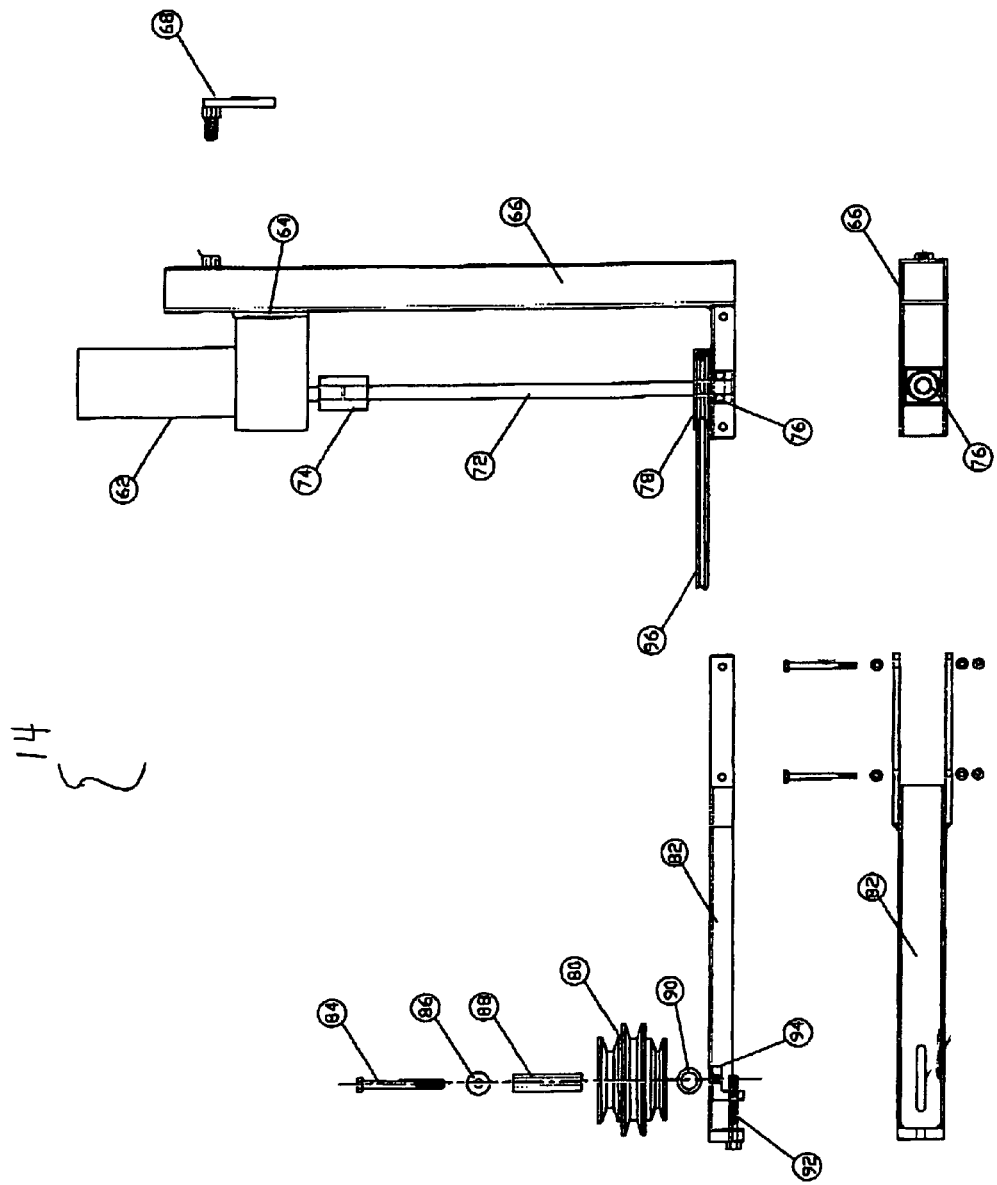
FIG. 5 is an exploded view from the side of a drive motor assembly.

As will be apparent, the system 30 allows one to deploy twice as many decoys 12 and have them move in various directions, and/or at the same speed, and/or at different speeds with one gear motor 62 (not shown in FIG. 2 but see, e.g., FIG. 5).

Figure 3:
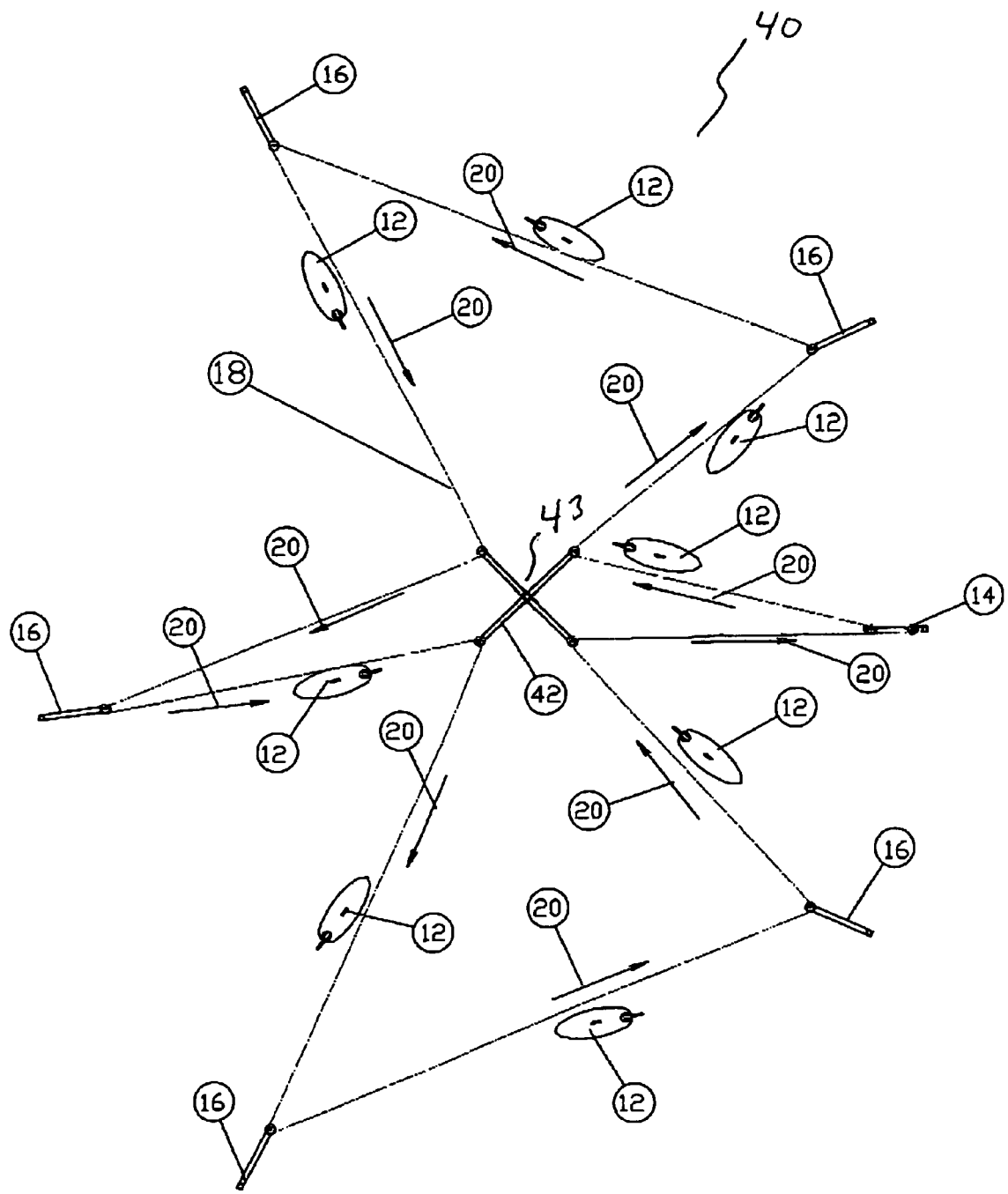
FIG. 3 is a top view of a single drive system with a quadruple idler assembly.

FIG. 3 is a view as seen from above of a single drive system 40 with a quadruple idler pulley assembly 42. The quadruple idler pulley assembly 42 helps reduce the time necessary to deploy the motion system by quickly establishing a center 43 about which the other single idler assemblies 16 can be positioned, and can reduce the total number of pieces one carries to the field. As will be apparent, in place of the quadruple idler pulley assembly 42 one may use a triple idler pulley assembly (not shown) and/or a quintuple idler pulley assembly (not shown) and/or a hextuple idler pulley assembly (not shown).

Figure 4:
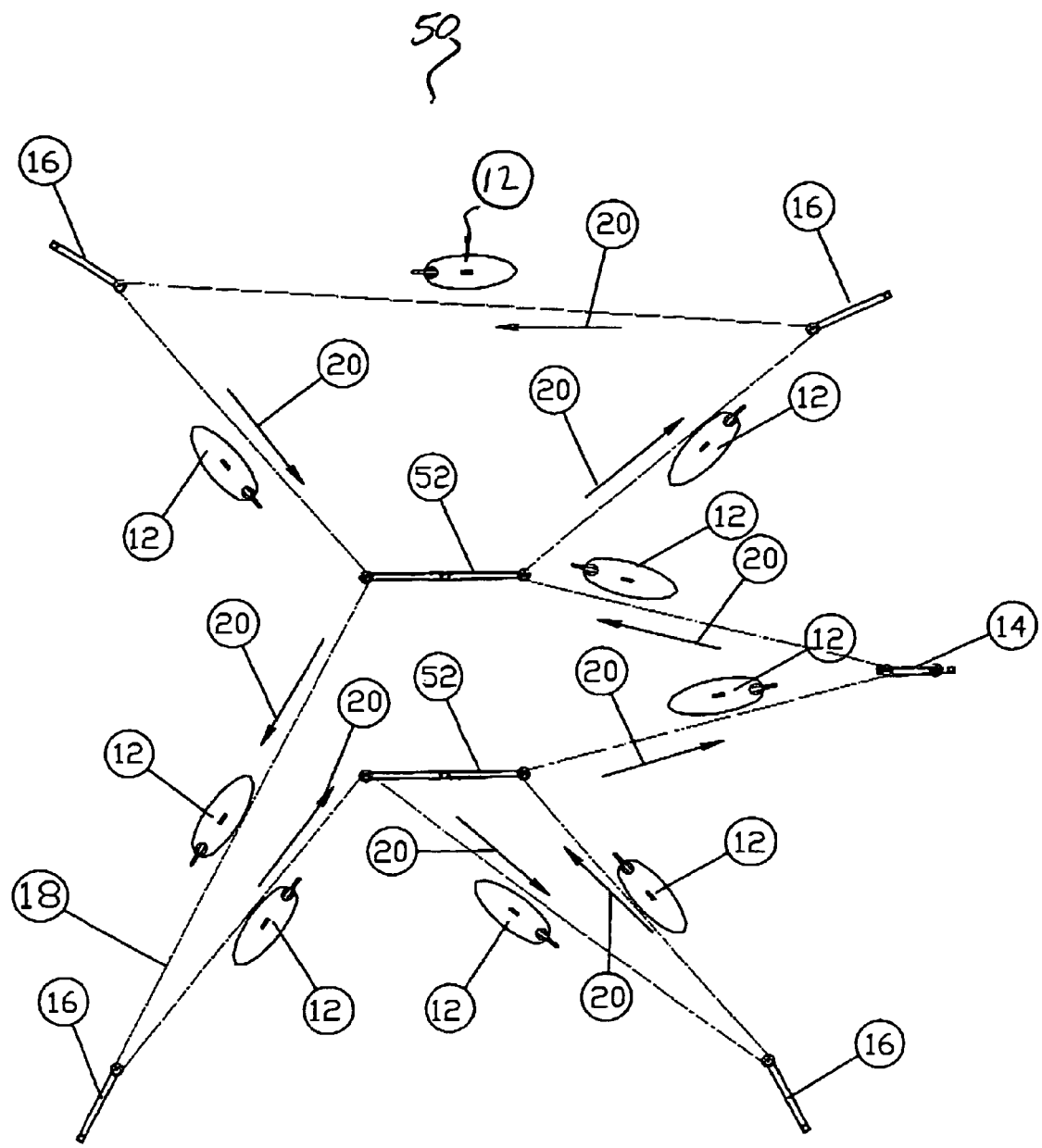
FIG. 4 is a top view of a single drive system with double idler pulley assemblies.

FIG. 4 is a view as seen from above of a single drive system 50 with a multiplicity of double idler pulley assemblies 52; in the preferred embodiment depicted, two such assemblies are shown. The double idler pulley assemblies 52 are useful to speed up deployment but offer deployment options not available with the quadruple idler assembly 42 (see FIG. 3) since they can positioned at greater distances from each other.

FIG. 5 is a side and bottom view of a preferred single drive assembly 14 that may be used, e.g., in the system depicted in FIG. 1. In the preferred embodiment depicted, the single drive assembly 14 is composed of a drive motor 62 that, preferably, is an electric drive motor. These types of drive motors are well known and are described, e.g., in U.S. Pat. Nos. 3,586,940 (apparatus with electric drive motor), 4,268,768 (office machine with an electric drive motor), 5,126,606 (electric drive motor, especially for control and regulation purposes), and the like. The entire disclosure of each of these United States patents is hereby incorporated by reference into this specification.

In on preferred embodiment, illustrated in FIG. 5, drive motor 62 is an electric gear motor that is wired to run on 12 or 24 volt direct current ("DC"). One may use the electric gear motors known to those skilled in the art such as, e.g., the electric gear motors described in U.S. Pat. Nos. 2,976,438 (electric gear motor drive unit), 5,447,477 (electric gear motor with epicyclical reduction and automatic brake), 7,308,904 (electric gear motor drive for switching valve), and the like. The entire disclosure of each of these United States patents is hereby incorporated by reference into this specification.

Referring again to FIG. 5, and in the preferred embodiment depicted therein, the drive motor 62 is preferably attached to the assembly by means of bolts (not shown) through the mounting plate 64 which is welded to the vertical support 66. The vertical support 66 preferably is tubular and has sufficient inside dimensions to allow it to be placed over a stake (not shown) driven into the bottom of a body of water (not shown in FIG. 5) and fastened thereto by means of hand screw 68.

The vertical support 66 is preferably of sufficient length to allow the lower part of the assembly to be positioned beneath the surface of the water at a depth which the hunter desires and which allows the drive motor 62 to be above the waterline.

In one embodiment, illustrated in FIG. 5, the vertical support 66 is square steel tubing; other shapes such as round tubing can advantageously be used.

In one embodiment, instead of being constructed of steel, the vertical support 66 is made of other materials, such as aluminum, which makes the assembly lighter and easier to transport.

One may use conventional means to fasten the assembly such as, e.g., stakes. The stakes used to fasten the assembly in a vertical position can be of any material with the necessary physical properties. Steel T-posts as sold in farm supply stores for fencing are readily available and relatively inexpensive and are particularly suited to this application due to their strength and availability in various lengths.

The motor 62 is preferably connected to the drive shaft 72 by means of a shaft coupling 74. The drive shaft 72 is preferably supported on the lower end by means of a bearing 76 which also reduces friction.

Referring again to FIG. 5, and to the preferred embodiment depicted therein, it will be seen that the primary drive pulley 78 is attached to the drive shaft 72 by means of set screw. The secondary drive pulley 80 is preferably connected to the horizontal support 82 by means of a bolt 84 through a vertical hollow shaft 88 of a length approximately ⅛" longer than the thickness of the pulley 80 about which it can rotate freely when properly secured.

The bolt 84 is preferably screwed into a v-belt tensioner 94. The v-belt 96 is tensioned by loosening the bolt 84 and turning the tensioning bolt 92 until the desired tension is achieved and then bolt 84 is tightened securely.

A plastic flat washer 90, approximately 1/16 inch thick, is placed under the secondary drive pulley 80 to reduce friction on the horizontal support 82; and another metal flat washer 86 with an outside diameter greater than the diameter of the hollow shaft 88 is placed under the head of bolt 84 to retain the secondary drive pulley 80.

The horizontal support 82 is preferably attached to the vertical support 66 by means of two bolts. The assembly is secured to a mounting stake by means of a hand screw 68.

When the motor 62 is energized, the drive shaft 72 and primary drive pulley 78 are caused to rotate in a horizontal plane. When the primary drive pulley 78 is connected to the corresponding groove in the secondary drive pulley 80 it will also be caused to rotate.

The elastic drive belt 18 (see FIG. 1) can then be placed on either of the top two grooves and, when properly tensioned, will also rotate.

The speed of the elastic drive belt 18 can be increased by moving it from the smaller diameter groove at the top of the secondary drive pulley 80 to the larger diameter groove beneath it and vice versa. The v-belt 96, primary drive pulley 78 and the portion of the secondary drive pulley 80 beneath the center groove, is covered by a guard (not shown) to prevent personal injury and entanglement.

One may use other and/or additional means for varying the speed. Further variations in speed can be achieved by replacing the primary drive pulley 78 with one of a larger or smaller pitch diameter.

Figure 6:
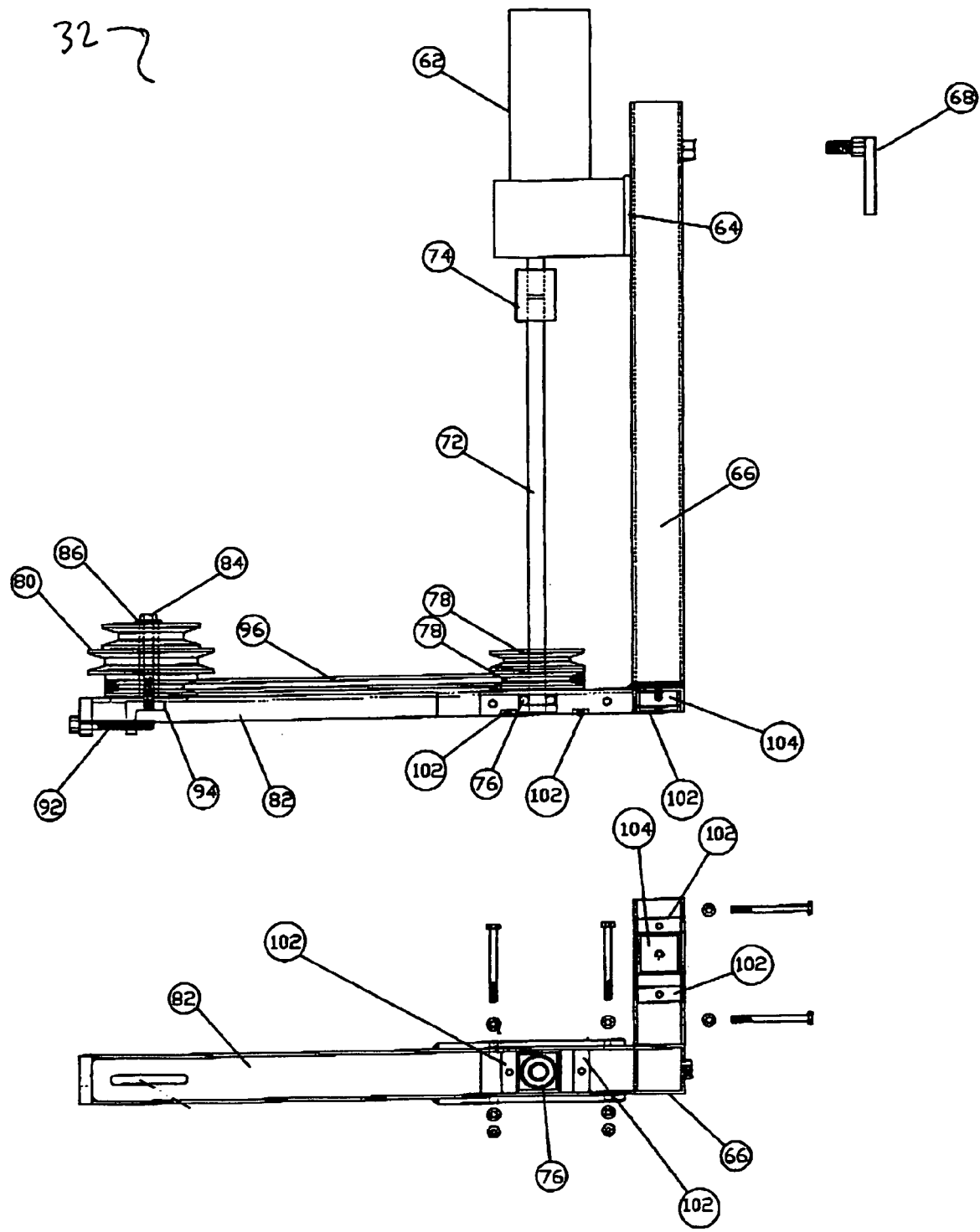
FIG. 6 is a partial side and bottom view of a double drive assembly.

FIG. 6 is a partial view of the side and bottom of a double drive assembly 32.

Figure 7A:
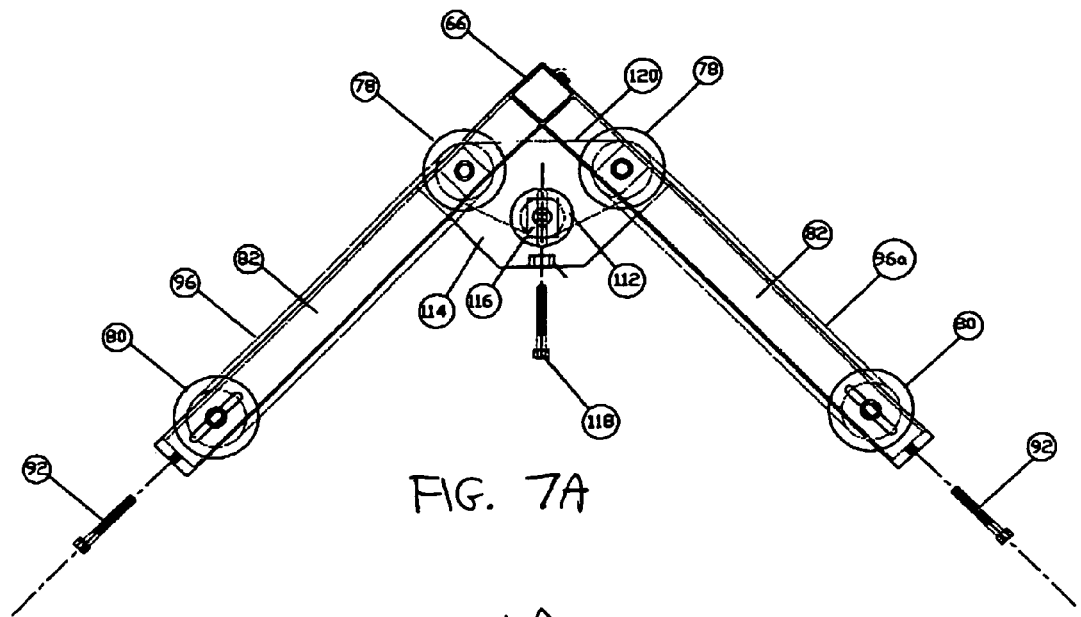
FIG. 7A is a top view of a double drive assembly.
Figure 7B:
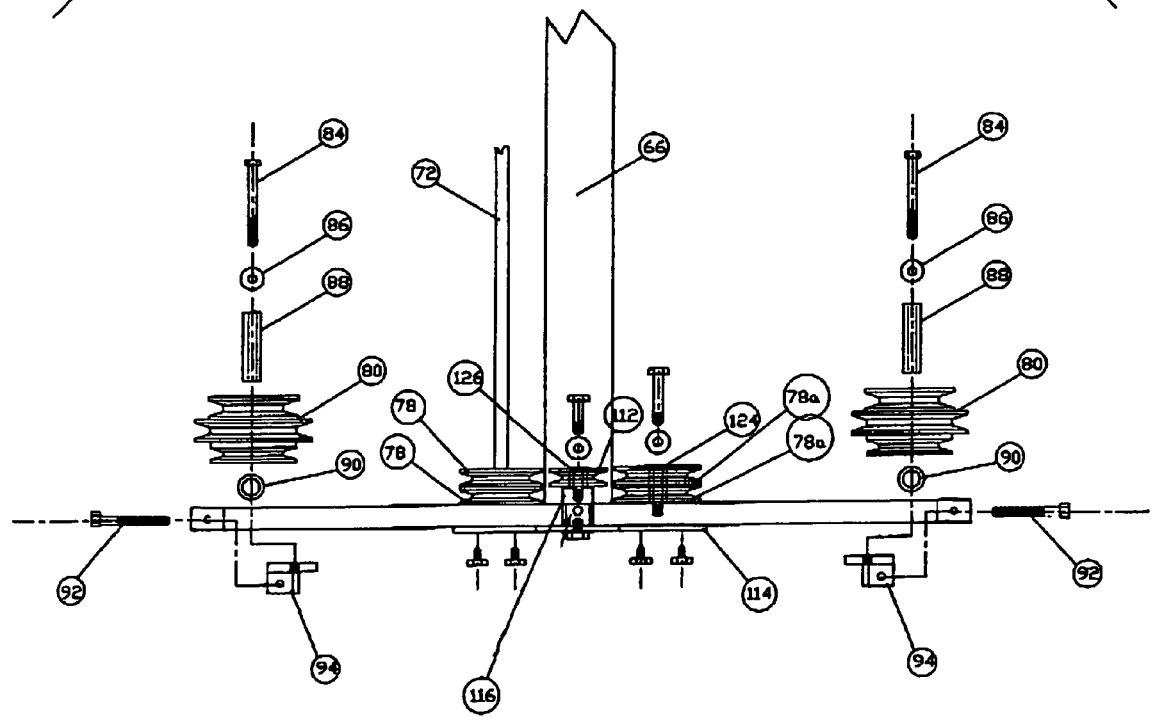
FIG. 7B is a front view of a double drive assembly.

In this embodiment depicted, parts 102 have been utilized to provide for the securing of a plate to the horizontal support 82 by means of bolts. Part 104 has been modified by replacing the bearing 76 with a tapped hole to facilitate securing pulleys 78*a* (see FIG. 7B) by means of a bolt through a hollow shaft 124 (FIG. 7B) about which it can rotate freely. Pulleys 78*a* are preferably of one piece construction; or, if two pulleys are used, they should be securely connected to insure that they will rotate together.

An idler pulley 112 (see FIGS. 7A and 7B) may be utilized to allow adjustment of the tension of the auxiliary v-belt 120 which is placed in the top grooves of pulleys 78, and 78*a*.

Pulley 112 is preferably secured to block 116 by means of a bolt through a hollow shaft 126 about which it can rotate freely.

Referring again to FIGS. 7A and 7B, Block 116 is secured to plate 114 by means of a bolt and flat washer. Plate 114 is slotted to allow block 116 to move when the adjusting screw 118 is turned. When the auxiliary v-belt 120 is properly tensioned, the bolt through the hollow shaft is tightened securely. In this device, when it is properly connected, the rotating force supplied by the drive shaft 72 is transferred from pulley 78 by means of an auxiliary v-belt 120 to pulley 78*a*.

Referring again to FIG. 7A, when v-belts 96 and 96*a* are in place and properly tensioned, pulleys 80 will also rotate when the drive shaft 72 turns. With the additional secondary drive pulley 80 one can now deploy a double system as seen in FIG. 2 without the addition of a second drive motor 62.

Figure 8:
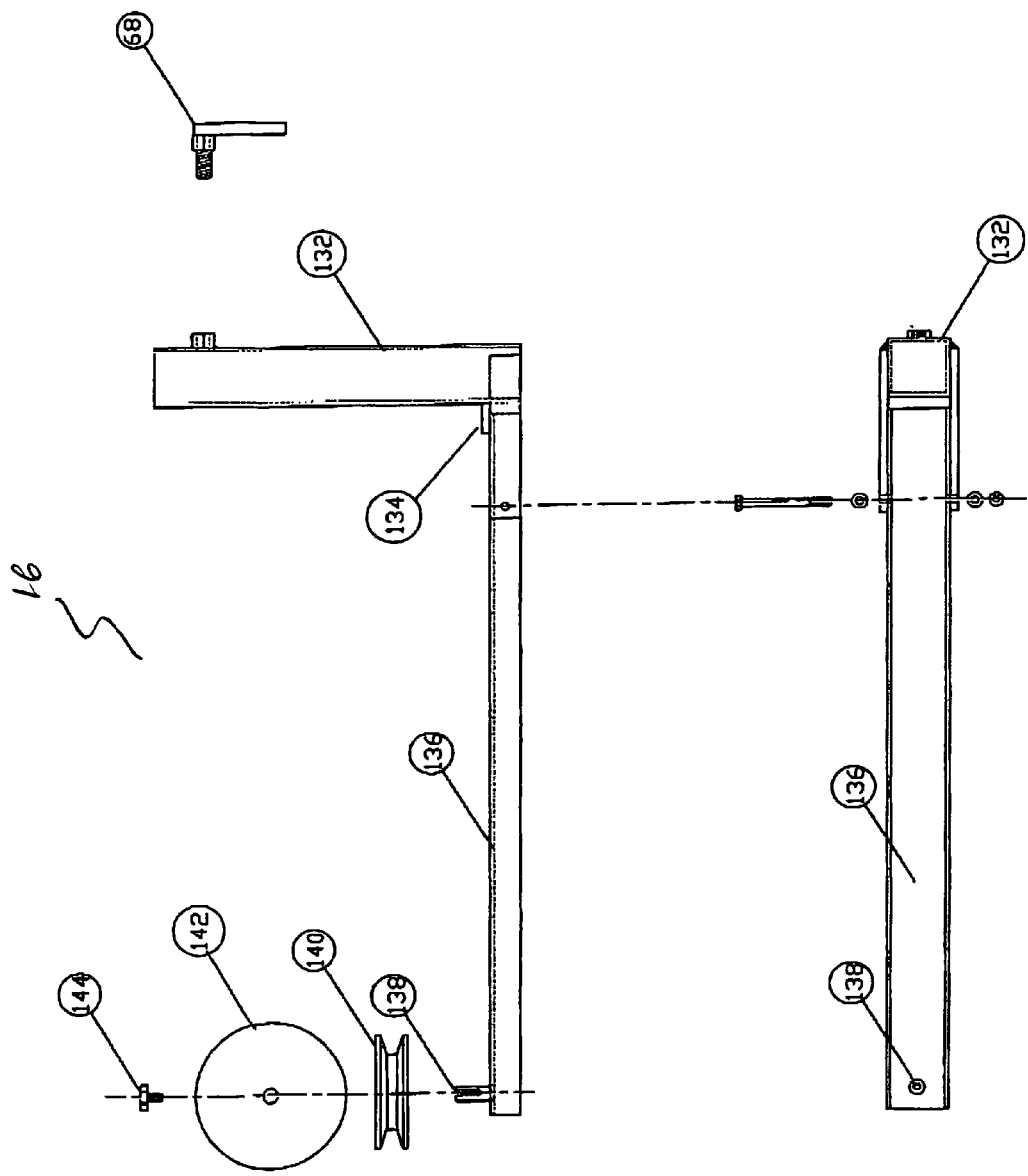
FIG. 8 is a side and bottom view of an idler pulley assembly.

FIG. 8 is a side and bottom view of an idler pulley assembly 16. In the embodiment depicted, the vertical support 132 is preferably tubular and can be secured to a mounting stake by means of hand screw 68.

Referring to FIG. 8, and in the preferred embodiment depicted therein, the horizontal support 136 is preferably made of steel bar channel and is attached to the vertical support 132 by means of a bolt and locking nut. The bolt and locking nut are preferably tightened in a manner to allow the horizontal support 136 to pivot freely. This allows the assembly to be easily folded for transport.

Referring again to FIG. 8, stop block 134 is welded to the vertical support 132 to limit travel when deployed. This pivoting feature allows the system to be to some degree self leveling when the drive belt 18 is properly tensioned. The horizontal support 136 could be made of other materials or of other shapes; thus e.g., it could be made of aluminum if a lighter weight system was desired.

The vertical shaft 138 is preferably welded to the horizontal support 136 on the under side and has a tapped hole in the upper end as shown. The idler pulley 140 is preferably attached to the vertical shaft 138 by means of a bolt 144 with a flat belt retaining disc 142 under the head. The non-rotating belt retaining disc 142 should preferably have an outside diameter approximately 1 inch greater than the diameter of the idler pulley 140. The exposed portion of shaft 138 should be at least 1/16 inch longer than the thickness of the pulley 140. Pulley 140 must be able to rotate freely about the shaft 138 when properly secured.

Figure 9:
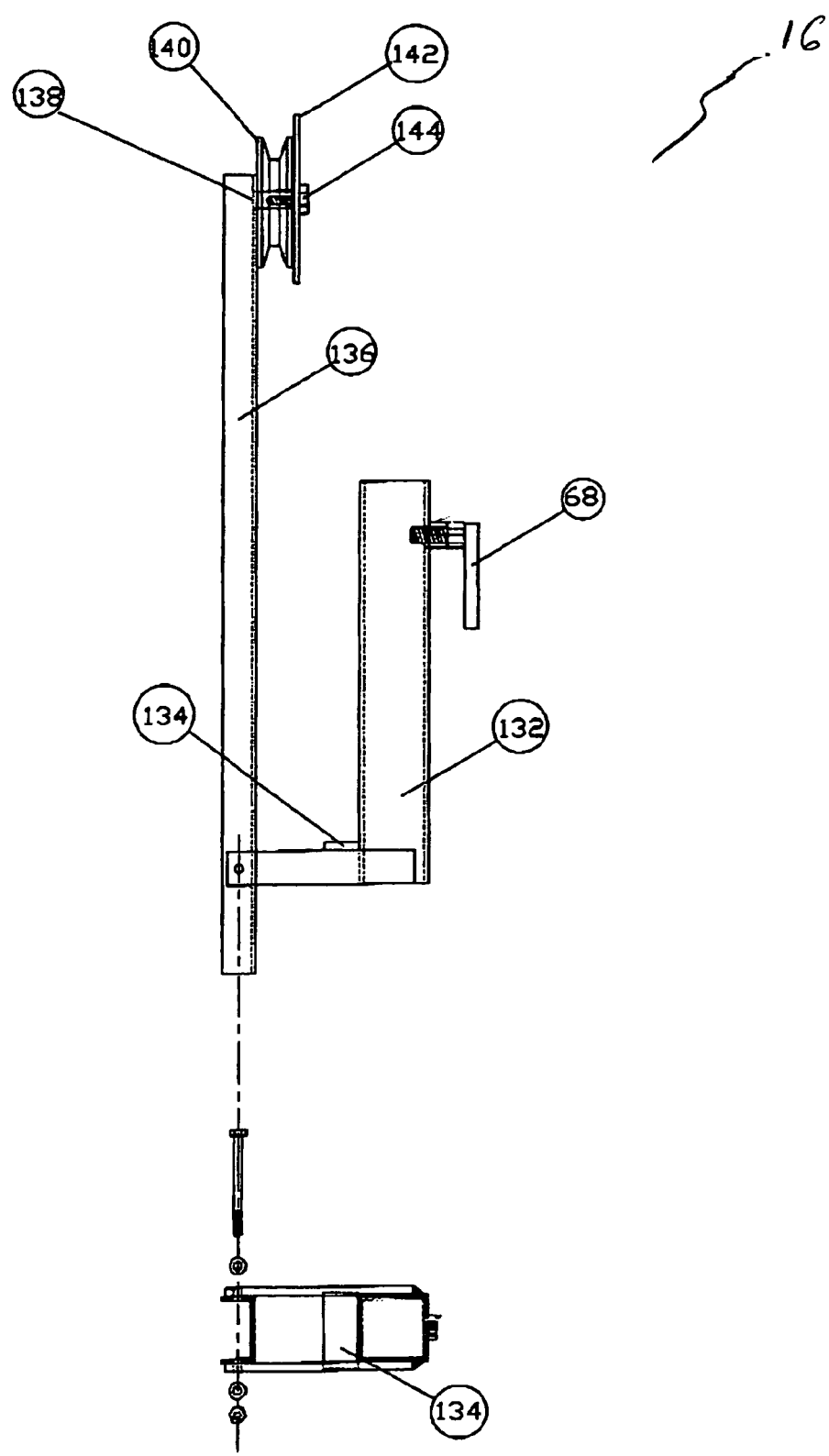
FIG. 9 is a side view of an idler pulley assembly in the transport position.

The idler pulley assembly 16 can easily be folded (as shown in FIG. 9) to facilitate transport.

Figure 10:
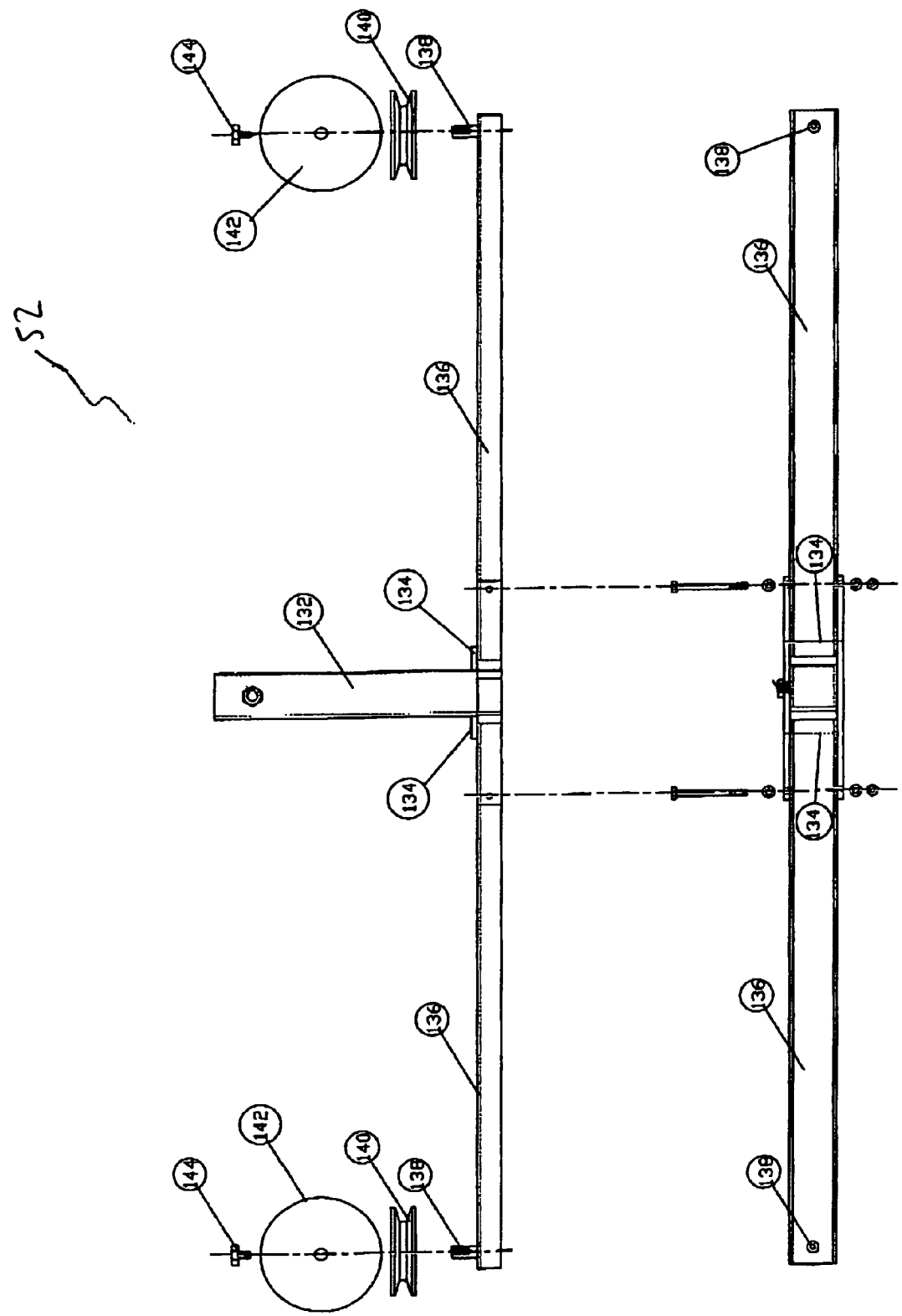
FIG. 10 is a side and bottom view of a double idler pulley assembly.
Figure 11:
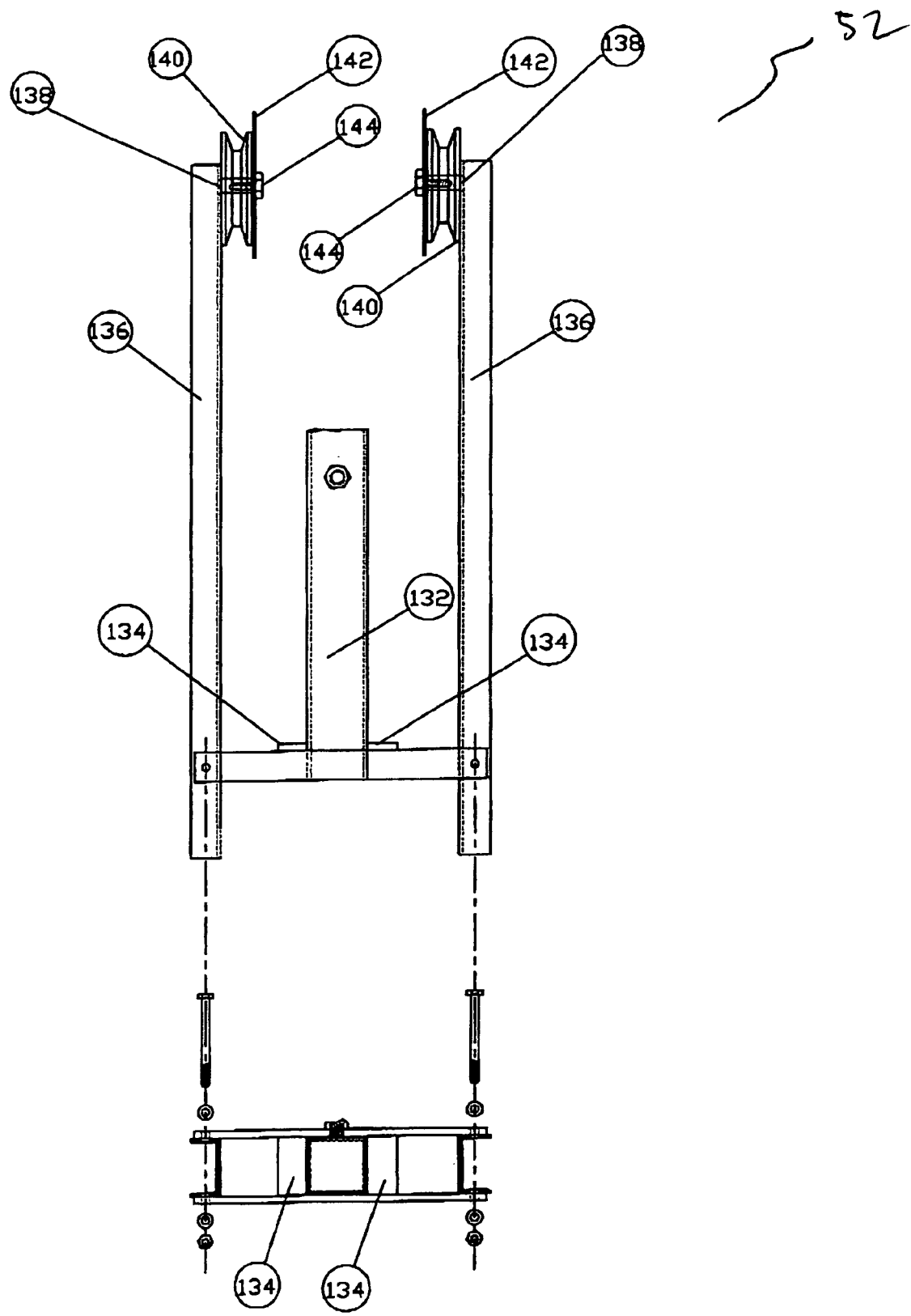
FIG. 11 is a side and bottom view of a double idler pulley assembly in the transport position.

FIG. 10 is a side and bottom view of a double idler pulley assembly 52; and FIG. 11 is a view of the double idler pulley assembly 52 in the transport position.

Figure 12:
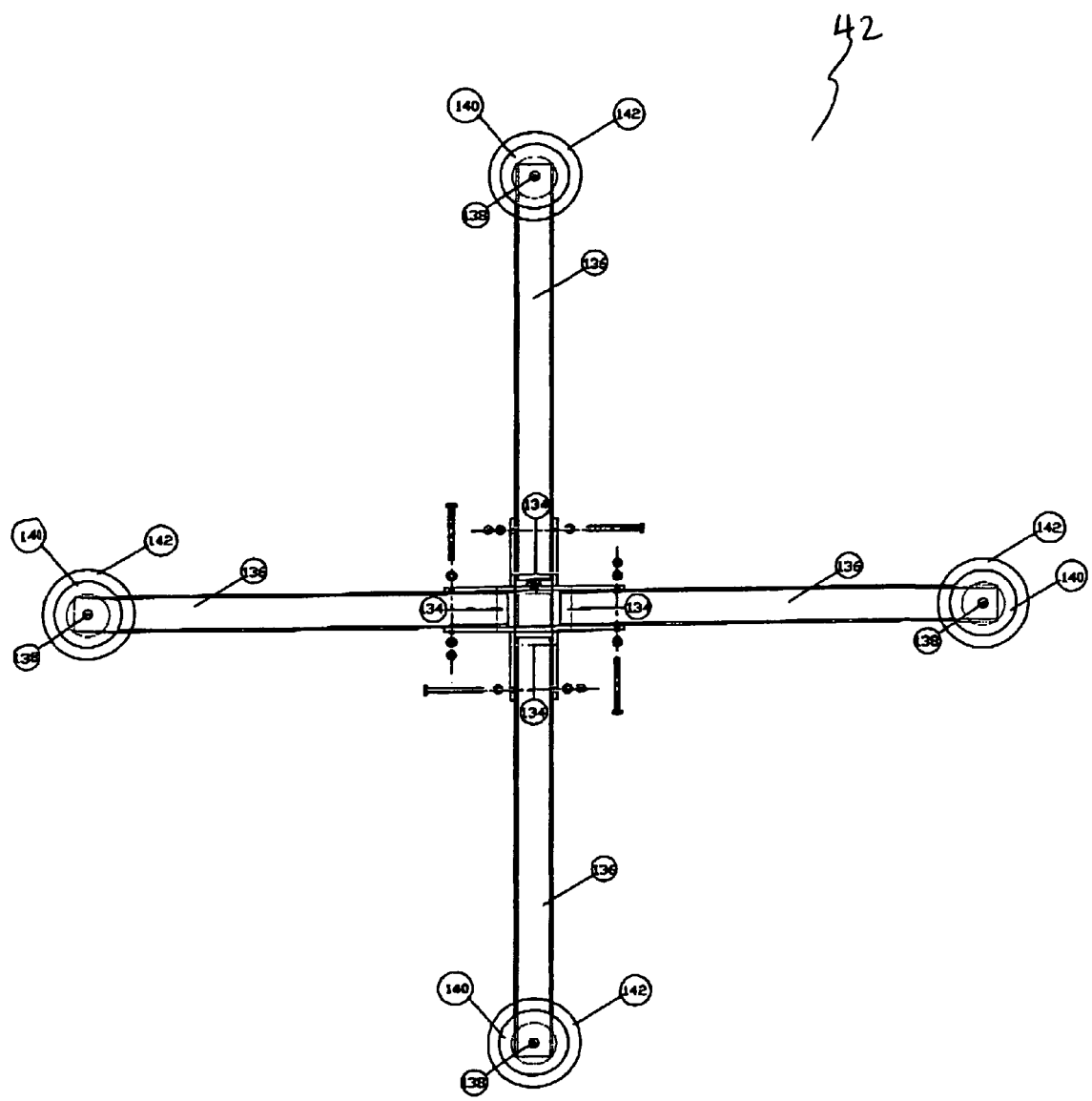
FIG. 12 is a top view of a quadruple idler pulley assembly.

FIG. 12 is a view as seen from above of a quadruple idler pulley assembly 42. This assembly may also be folded to facilitate transport. The variations of the idler assemblies depicted in FIGS. 10, 11, and 12 are preferably constructed in the same manner described elsewhere in this specification with additional supports 136 and additional idler pulleys 140 being the primary differences. It is preferred that the vertical support(s) be of sufficient length to allow the lower part of the assembly to be placed beneath the surface of the water at the desired depth.

The elastic drive belt 18 (see e.g., FIG. 1) is preferably made from an elastomeric material. As is known to those skilled in the art, an elastomer is a polymeric material, such as synthetic rubber or plastic, which at room temperature can be stretched under low stress to at least twice its original length and, upon immediate release of the stress, will return with force to its approximate original length.

Elastomeric belts are well known to those skilled in the art. Reference may be had, e.g., to U.S. Pat. Nos. 3,767,337 (apparatus for curing endless electrometric belts), 3,793,426 (method for curing endless electrometric belts), 5,326,332 (endless electrometric belt), 6,123,339 (mobile constructive vehicle driven by track assemblies using continuous electrometric belts), 6,142,878 (flexible coupling with electrometric belt), and the like.

In one preferred embodiment, the electrometric material used in the drive belt 18 is a synthetic rubber material. Synthetic rubber elastomers are well known. Reference may be had, e.g., to U.S. Pat. Nos. 3,959,545 (high green strength synthetic rubber product), 4,477,612 (lignin reinforced synthetic rubber), 4,647,607 (synthetic rubber with guayule resin stabilization), 6,855,791 (vulcanization of natural and synthetic rubber compounds), and the like. The entire disclosure of each of these United States patents is hereby incorporated by reference into this specification.

In one embodiment, the belt 18 is made from EPDM rubber. EPDM (ethylene-propylene-diene monomer) is particularly suited to this outdoor application due its resistance to water and aging and the fact that it maintains flexibility at low temperatures. It has a stretch limit of 300% of its relaxed length and a high tensile strength.

EPDM rubber is well known to those skilled in the art. Reference may be had, e.g., to U.S. Pat. Nos. 3,492,371 (electrometric blends comprising EPDM rubber), 4,128,523 (polyethylene-EPDM compositions), and the like. The entire disclosure of each of these United States patents is hereby incorporated by reference in to this specification.

Physical Properties of the Belt 18

In one embodiment, the preferred belt 18 has an elongation to break of from 300 percent to 600 percent. In one aspect of this embodiment, the tensile strength of the preferred belt 18 is from about 800 pounds per square inch to about 3000 pounds per square inch.

The cross sectional dimensions of the preferred belt 18 are 1/18" thick×0.5"; it is preferred that such belt 18 have a substantially rectangular cross-sectional shape. The ends of the belt 18 can be joined by means of vulcanizing, by the use of an adhesive designed for this material, and/or in an emergency the ends may be tied in a square knot to form a continuous circle or belt.

Figure 13A:
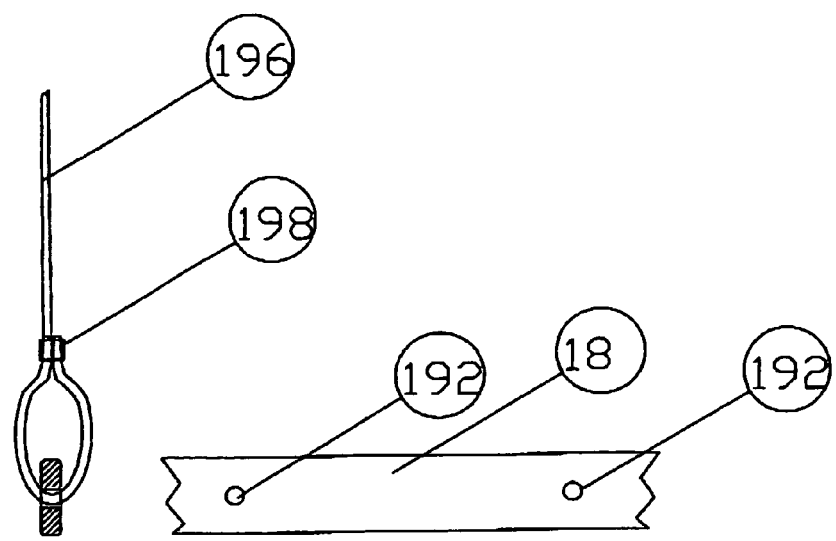
FIGS. 13A and 13B are, respectively, a side and end view of a section of the drive belt which shows two methods of attaching the waterfowl decoys.
Figure 13B:
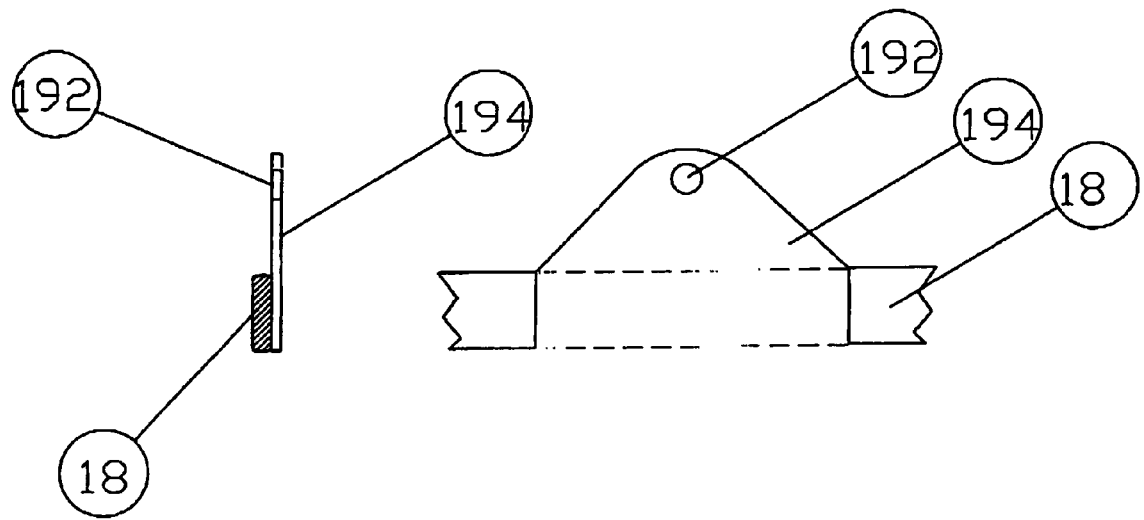

FIGS. 13A and 13B show two methods of attaching the decoy lines to the drive belt 18. In the upper view, holes 192 are punched through the center of the drive belt 18 to accommodate the decoy line. The preferred decoy line 196 is made of round synthetic rubber or PVC cord and is connected by means of metal crimps 198 as shown. Both items are readily available from sporting goods stores. Line or cord of other types could be used and tied with knots.

In the lower view, another method is illustrated which is a thin piece of the synthetic rubber material 194 attached to the drive belt 18 by means of an adhesive designed for the material. The decoy line or cords can then be attached to the drive belt 18 in the manner described above. The holes 192 or synthetic rubber strips 194 can be punched or glued to the drive belt 18 at intervals to accommodate the desired number of decoys.

The pursuit of waterfowl has been a human endeavor for thousands of years. Thus, e.g., ancient North American artifacts have been recovered which indicate that native Americans were using decoys made of hollow reeds to lure waterfowl long before the first European set foot upon the continent.

As will be appreciated by those skilled in the art, the invention described in the preceding sections of this specification is especially advantageous for hunting waterfowl. Waterfowl by nature are gregarious, frequently gathering in large flocks. They have a sophisticated means of vocal communication and when hunted are extremely wary.

Hunters use two basic methods, concealment and enticement, to take these wary birds. Typically a hunter will conceal himself near a place where he believes they frequent and then attempt to entice the birds into gun range by use of decoys and duck or goose calls to imitate the sounds made by live waterfowl.

The invention described in this specification makes possible a more effective means of deploying decoys. Normally decoys are attached to an anchor and placed in groups near the place of concealment. The present state of the art of decoy manufacturing makes available decoys of very high quality that resemble the various species in great detail. When deployed in this manner, the decoys may look like the live birds in shape and color but are otherwise dependent upon wind or current to produce any movement which greatly aids the hunter in his attempted deception.

The motion system of this invention enables a hunter to put in motion a large number of decoys and to effectively imitate live birds swimming in a natural manner. The system preferably employs a non-submersible electric drive motor to propel an elastic drive belt in a continuous circuit to which single decoys or small groups of decoys connected together are attached. The elastic qualities of the drive belt make it possible to deploy this system in approximately twenty to thirty minutes and to take it up in about half as much time. This is a degree of portability not presently available for a system capable of providing lifelike motion to several dozen decoys.

This system requires no precise placement of supports for the drive belt and can easily be routed around obstacles, such as clumps of grass or brush, that are commonly found in flooded areas waterfowl frequent. The elastic drive belt is quickly repairable by means of adhesives designed for the material which are readily available in hardware and department stores and which are relatively inexpensive. The speed and ease of repairing a belt makes it practical for a hunter to intentionally cut it in order to route it through trees or brush to further enhance the illusion of waterfowl swimming in a natural manner in and out of flooded timber. The route or path of travel of the drive belt can be quickly and easily changed by moving a support(s) to a new location(s). When the drive belt is properly tensioned the system will, in most cases, continue to function after the belt has come off of one of the idler pulleys, allowing a sportsman to continue hunting unimpeded until he desires to correct the malfunction. With this system it is possible for hunters to safely wade through it and for dogs to retrieve downed birds without fear of injury or of damaging the system.

In one preferred embodiment, the supports for the drive motor assembly and the idler pulley assemblies are preferably adjustable up and down to enable the hunter to position the drive belt and attach the decoys above the waterline which adds to the speed and comfort of deployment.

In summary, this invention described in this specification provides waterfowl hunters with a portable, durable, easily deployed means of providing lifelike motion to a number of waterfowl decoys.

We claim:

1. A waterfowl decoy motion system comprising:
 a multiplicity of movable decoys,
 a first endless elastic drive belt having holes through said belt for connecting to said movable decoys,
 a primary drive pulley,
 a secondary drive pulley,
 an electric motor connected to said secondary drive pulley, and
 a multiplicity of idler puller assemblies.

2. The waterfowl decoy motion system as recited in claim 1, wherein said system further comprises a second elastic drive belt.

3. The waterfowl decoy motion system as recited in claim 1, wherein said first elastic drive belt has an elongation to break of from about 300 to about 600 percent.

4. The waterfowl decoy motion system as recited in claim 3, wherein said first elastic drive belt has a tensile strength of from about 800 to about 3,000 pounds per square inch.

5. The waterfowl decoy motion system as recited in claim 4, wherein said first elastic drive belt is comprised of an elastomeric material.

6. The waterfowl decoy motion system as recited in claim 5, wherein said first drive belt consists essentially of ethylene-propylene-diene-monomer rubber.

7. The waterfowl decoy motion system as recited in claim 4, wherein said electric motor is an electric drive motor.

8. The waterfowl decoy motion system as recited in claim 7, wherein said drive motor is an electric gear motor.

9. The waterfowl decoy motion system as recited in claim 4, further comprising means for varying the speed at which said first elastic drive belt is moved.

10. The waterfowl decoy motion system as recited in claim 4, wherein said system is comprised of a single drive assembly, and wherein said first elastic drive belt is disposed between said single drive assembly and two of said idler puller assemblies.

11. The waterfowl decoy motion system as recited in claim 4, wherein said system is comprised of a second elastic drive belt.

12. The waterfowl decoy motion system as recited in claim 11, wherein said system is comprised of a double drive assembly comprised of a first arm and a second arm.

13. The waterfowl decoy motion system as recited in claim 12, wherein said first elastic drive belt is disposed between said first arm of said double drive assembly and a first idler pulley assembly and also is disposed between said first arm of said double drive assembly and a second idler pulley assembly.

14. The waterfowl decoy motion system as recited in claim 13, wherein said second elastic drive belt is disposed between said second arm of said double drive assembly and a third idler pulley assembly and also is disposed between said second arm of said double drive assembly and a fourth idler pulley assembly.

15. The waterfowl decoy motion system as recited in claim 4, wherein said system is further comprised of a quadruple idler pulley assembly that comprises a first arm, a second arm, a third arm, and a fourth arm.

16. The waterfowl decoy motion system as recited in claim 15, wherein said first elastic drive belt is disposed between a first idler pulley assembly, said first arm of said quadruple idler pulley assembly, and a second idler pulley assembly.

17. The waterfowl decoy motion system as recited in claim 16, wherein said first elastic drive belt is disposed between a third idler pulley assembly, said second arm of said quadruple idler pulley assembly, and a fourth idler pulley assembly.

18. The waterfowl decoy motion system as recited in claim 17, wherein said first elastic drive belt is disposed between a fifth idler pulley assembly, said third arm of said quadruple idler pulley assembly, and a sixth idler pulley assembly.

* * * * *